US005402496A

United States Patent [19]

Soli et al.

[11] Patent Number: 5,402,496

[45] Date of Patent: Mar. 28, 1995

[54] AUDITORY PROSTHESIS, NOISE SUPPRESSION APPARATUS AND FEEDBACK SUPPRESSION APPARATUS HAVING FOCUSED ADAPTIVE FILTERING

[75] Inventors: Sigfrid D. Soli, Sierra Madre, Calif.; Kevin M. Buckley, Robbinsdale; Gregory P. Widin, West Lakeland Township, Washington County, both of Minn.

[73] Assignee: Minnesota Mining and Manufacturing Company, St. Paul, Minn.

[21] Appl. No.: 912,886

[22] Filed: Jul. 13, 1992

[51] Int. Cl.[6] .............................................. H04B 15/00
[52] U.S. Cl. .......................................... 381/94; 381/71
[58] Field of Search ........................ 381/94, 71, 83, 93

[56] References Cited

U.S. PATENT DOCUMENTS

| | | | |
|---|---|---|---|
| 4,548,082 | 10/1985 | Engebretson et al. | 73/585 |
| 4,658,426 | 4/1987 | Chabries et al. | 381/94 |
| 4,947,434 | 8/1990 | Ito | 381/71 |
| 5,016,280 | 5/1991 | Engebretson et al. | 381/93 |
| 5,222,148 | 6/1993 | Yuan | 381/71 |

FOREIGN PATENT DOCUMENTS 0339819 11/1989 European Pat. Off. ..... H03H 17/02

OTHER PUBLICATIONS

The Journal of the Acoustical Society of America, No. 3, "Evaluation of an adaptive beamforming method for hearing aids," Julie E. Greenberg and Patrick M. Zurĕck (Mar. 1992).

Widrow et al, "Adaptive Noise Cancelling: Principles and Applications", *Proceedings IEEE*, vol. 63, No. 12, pp. 1692–1716 (Dec. 1975).

Elliott et al, "A Multiple Error LMS Algorithm and Its Application to the Active Control of Sound and Vibration", *IEEE Transactions on Acoustics, Speech, and Signal Processing*, vol. ASSP-35, No. 10, pp. 1423–1434 (Oct. 1987).

Widrow et al, *Adaptive Signal Processing*, pp. 288–300, Prentice–Hall, Inc. (1985).

Haykin, *Adaptive Filter Theory*, p. 261, Prentice–Hall (1986).

(List continued on next page.)

*Primary Examiner*—Curtis Kuntz
*Assistant Examiner*—Ping W. Lee
*Attorney, Agent, or Firm*—Gary L. Griswold; Walter N. Kirn; William D. Bauer

[57] ABSTRACT

A noise and feedback suppression apparatus processes an audio input signal having both a desired component and an undesired component. When implemented so as to effect noise cancellation, the apparatus includes a first filter operatively coupled to the input signal. The first filter generates a focused reference signal by selectively passing an audio spectrum of the input signal which primarily contains the undesired component. The reference signal is supplied to an adaptive filter disposed to filter the input signal so as to provide an adaptive filter output signal. A combining network subtracts the adaptive filter output signal from the input signal to create an error signal. The noise suppression apparatus further includes a second filter for selectively passing to the adaptive filter an audio spectrum of the error signal substantially encompassing the spectrum of the undesired component of the input signal. This cancellation effectively removes the undesired component from the input signal without substantially affecting the desired component of the input signal. When the present apparatus is implemented so as to suppress feedback the adaptive filter output signal is employed to cancel a feedback component from the input signal.

34 Claims, 11 Drawing Sheets

OTHER PUBLICATIONS

O'Connell et al, *An Adaptive Noise Reduction Algorithm for Digital Hearing Aids*, (5 pages).

Bustamante et al, "Measurement and Adaptive Suppression of Acoustic Feedback in Hearing Aids", *ICASSP Proceedings*, pp. 2017–2020 (1989).

Chabries et al, "Application of Adaptive Digital Signal Processing to Speech Enhancement for the Hearing Impaired", *Journal of Rehabilitation Research and Development*, vol. 24, No. 4, pp. 65–74 (1987).

Weiss, "Use of an Adaptive Noise Canceler as an Input Preprocessor for a Hearing Aid", *Journal of Rehabilitation Research and Development*, vol. 24, No. 4, pp. 93–102 (1987).

Neuman et al, "The Effect of Filtering on the Intelligibility and Quality of Speech in Noise", *Journal of Rehabilitation Research and Development*, vol. 24, No. 4, pp. 127–134 (1987).

Chabries et al, "Application of the LMS Adaptive Filter to Improve Speech Communication in the Presence of Noise", *Proceedings of ICASSP82-IEEE International Conference on Acoustics, Speech & Signal Processings*, vol. 1, pp. 148–151 (1982).

AUDITORY PROSTHESIS, NOISE SUPPRESSION APPARATUS AND FEEDBACK SUPPRESSION APPARATUS HAVING FOCUSED ADAPTIVE FILTERING

The present invention relates generally to auditory prosthesis, noise suppression apparatus and feedback suppression apparatus used in acoustical systems, and particularly to such prostheses and apparatus having adaptive filtering.

BACKGROUND OF THE INVENTION

Designers of audio signal processing systems including auditory prostheses face the continuing challenge of attempting to eliminate feedback and noise from an input signal of interest. For example, a common complaint among users of auditory prosthesis such as hearing aids is their inability to understand speech in a noisy environment. In the past, hearing aid users were limited to listening-in-noise strategies such as adjusting the overall gain via volume control, adjusting the frequency response, or simply removing the hearing aid. More recent hearing aids have used noise reduction techniques based on, for example, the modification of the low frequency gain in response to noise. Typically, however, these strategies and techniques have been incapable of achieving a desired degree of noise reduction.

Many commercially available hearing aids are also subject to the distortion, ringing and squealing engendered by acoustical feedback. This feedback is caused by the return to the input microphone of a portion of the sound emitted by the acoustical hearing aid output transducer. Such acoustical feedback may propagate either through or around an earpiece used to support the transducer.

In addition to effectively reducing noise and feedback, a practical ear-level hearing aid design must accommodate the power, size and microphone placement limitations dictated by current commercial hearing aid designs. While powerful digital signal processing techniques are available, they require considerable space and power in the hearing aid hardware and processing time in the software. The miniature dimensions of hearing aids place relatively rigorous constraints on the space and power which may be devoted to noise and feedback suppression.

One approach to remedying the distortion precipitated by noise and feedback interference involves the use of adaptive filtering techniques. The frequency response of the adaptive filter can be made to self-adjust sufficiently rapidly to remove statistically "stationary" (i.e., slowly-changing) noise components from the input signal. Adaptive interference reduction circuitry operates to eliminate stationary noise across the entire frequency spectrum, with greater attenuation being accorded to the frequencies of high energy noise. However, environmental background noise tends to be concentrated in the lower frequencies, in most cases below 1,000 Hertz.

Similarly, undesirable feedback harmonics tend to build up in the 3,000 to 5,000 Hertz range where the gain in the feedback path of audio systems tends to be the largest. As the gain of the system is increased the distortion induced by feedback harmonics introduces a metallic tinge to the audible sound. Distortion is less pronounced at frequencies below 3,000 Hertz as a consequence of the relatively lower gain in the feedback path.

Although background noise and feedback energy are concentrated in specific spectral regions, adaptive noise filters generally operate over the entire bandwidth of the hearing aid. Adaptive noise filters typically calculate an estimate of noise by appropriately adjusting the weighting parameters of a digital filter in accordance with the Least Mean Square (LMS) algorithm, and then use the estimate to minimize noise. The relationship between the mean square error and the N weight values of the adaptive filter is quadratic. To minimize the mean square error, the weights are modified according to the negative gradient of an error surface obtained by plotting the mean square error against each of the N weights in N dimensions. Each weight is then updated by (i) computing an estimate of the gradient; (ii) scaling the estimate by a scaler adaptive learning constant, $\mu$; and (iii) subtracting this quantity from the previous weight value.

This full-frequency mode of adjustment tends to skew the noise and feedback suppression capability of the filter towards the frequencies of higher signal energy, thereby minimizing the mean-square estimate of the energy through the adaptive filter. However, the set of parameters to which the adaptive filter converges when the full noise spectrum is evaluated results in less than desired attenuation over the frequency band of interest. Such "incomplete" convergence results in the noise and feedback suppression resources of the adaptive filter not being effectively concentrated over the spectral range of concern.

Accordingly, a need in the art exists for an adaptive filtering system wherein noise or feedback suppression capability is focused over a selected frequency band.

SUMMARY OF THE INVENTION

In summary, the present invention comprises a noise and feedback suppression apparatus for processing an audio input signal having both a desired component and an undesired component. When implemented so as to effect noise cancellation the present invention includes a first filter operatively coupled to the input signal. The first filter generates a reference signal by selectively passing an audio spectrum of the input signal which primarily contains the undesired component. The reference signal is supplied to an adaptive filter disposed to filter the input signal so as to provide an adaptive filter output signal. A combining network operatively coupled to the input signal and to the adaptive filter output signal uses the adaptive filter output signal to cancel the undesired component from the input signal and create an error signal. The noise suppression apparatus further includes a second filter for selectively passing to the adaptive filter an audio spectrum of the error signal substantially encompassing the spectrum of the undesired component of the input signal. This cancellation effectively removes the undesired component from the input signal without substantially affecting the desired component of said input signal.

When implemented to suppress feedback within, for example, a hearing aid, the present invention includes a combining network operatively coupled to an input signal and to an adaptive filter output signal. The combining network uses the adaptive-filter output signal to cancel the feedback component from the input signal and thereby deliver an error signal to a hearing aid signal processor. The inventive feedback suppression circuit further includes an error filter disposed to selectively pass a feedback spectrum of the error signal to the adaptive filter. A reference filter supplies a reference signal to the adaptive filter by selectively passing the feedback spectrum of the noise signal, wherein the adaptive filter output signal is synthesized in response to the reference signal.

In a preferred embodiment, a noise probe signal is inserted into the output signal path of the feedback suppression circuit to supply a source of feedback during times of little containment of the undesired feedback signal being present within the audio environment of the circuit. The noise probe signal may also be supplied directly to the adaptive filter to aid in the convergence of the adaptive filter.

Optionally, a second microphone may be used in place of input delay of the noise suppression circuit or in place of the noise probe signal in the feedback suppression circuit.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE PREFERRED EMBODIMENTS

The noise suppression and feedback cancellation circuits of the present invention operate to focus the adaptive filtering systems included therein over particular frequency bands of interest. In this way adaptive filtering capacity is concentrated in a predefined manner, thereby enabling enhanced convergence of the adaptive filter across the noise and feedback bands of concern. The present invention focuses filtering resources in this manner by employing shaping filters disposed to selectively transmit energy from specific spectral bands to the adaptive filter included within each circuit.

Noise Suppression Circuit

Figure 1:
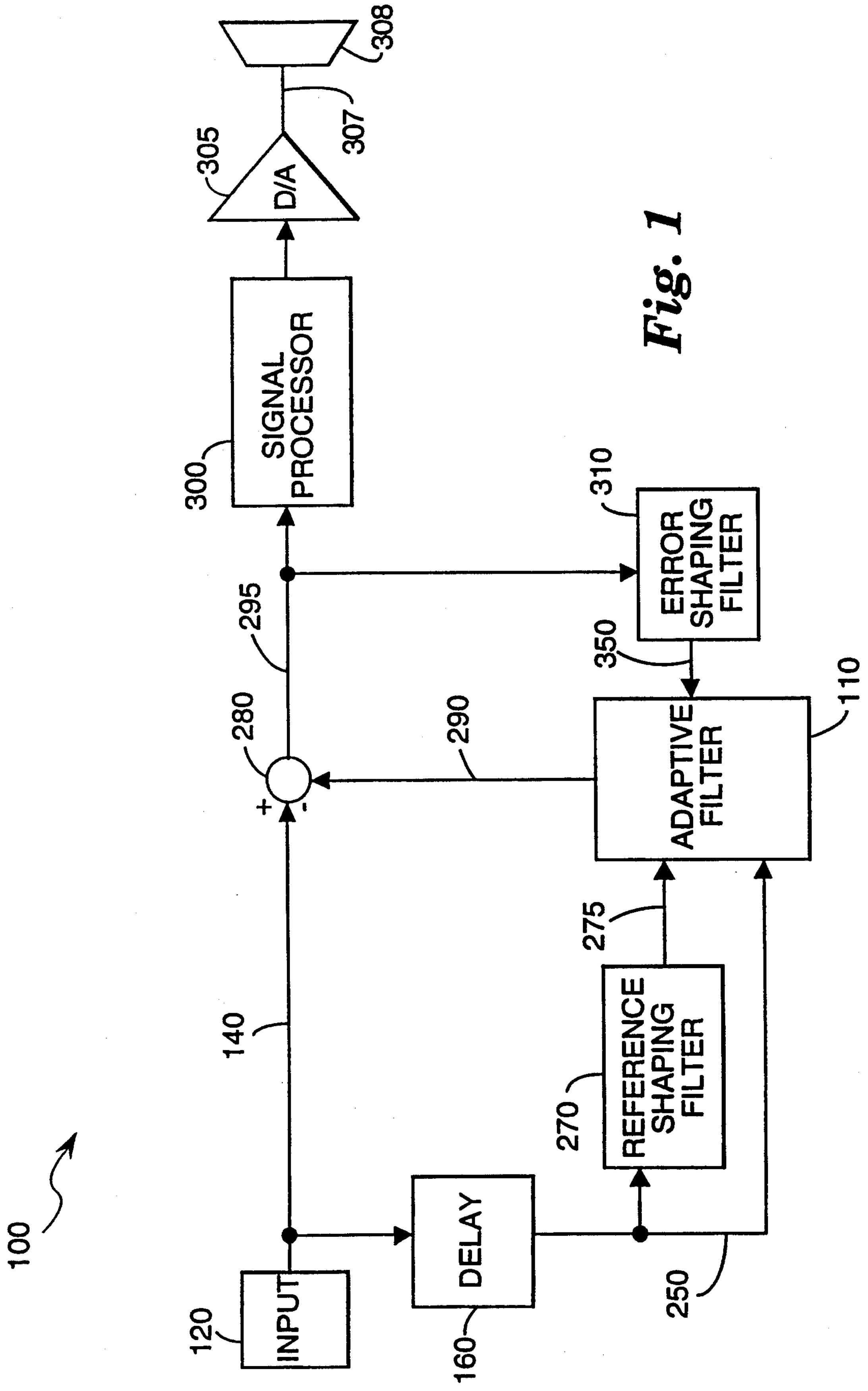
FIG. 1 is a simplified block diagrammatic representation of a noise suppression apparatus of the present invention as it would be embodied in an auditory prosthesis.

Referring to FIG. 1, a noise suppression circuit 100 for use in auditory prosthesis such as hearing aids uses a time-domain method for focusing the bandwidth over which undesired noise energy is suppressed. As is described more fully below, the noise elimination band of an adaptive filter 110 is defined by selectively pre-filtering reference and error inputs provided to adaptive filter 110. This signal shaping focuses noise suppression circuit 100 on the frequency band of interest, thus resulting in efficient utilization of the resources of adaptive filter 110.

Noise suppression circuit 100 has an input 120 representative of any conventional source of a hearing aid input signal such as that produced by a microphone, signal processor, or the like. Input 120 also includes an analog to digital converter (not shown) for analog inputs so that the input signal 140 is a digital signal. Input signal 140 is received by an J-sample delay 160 and by a signal combiner 280. Delay 160 serves to decorrelate, in time, delayed input signal 250 supplied to adaptive filter 110 from input signal 140. The length of delay 160 will generally be selected to be of a duration which preserves the auto-correlation between noise energy within input signal 140 and delayed input signal 250 yet which significantly reduces the auto-correlation of the speech energy within the two signals. Specifically, delay 160 will preferably be sufficiently long to reduce the auto-correlation of the speech energy within input signal 140 and delayed input signal 250 such that minimum speech cancellation occurs through the adaptive filtering process. For example, at a 10 kiloHertz sampling rate, an eight sample delay results in an acceptable time delay of eight hundred microseconds. It is also believed that such a delay will preserve the auto-correlation between the noise energy within input signal 140 and delayed input signal 250 to the extent required to enable a suitable degree of noise cancellation.

Figure 9:
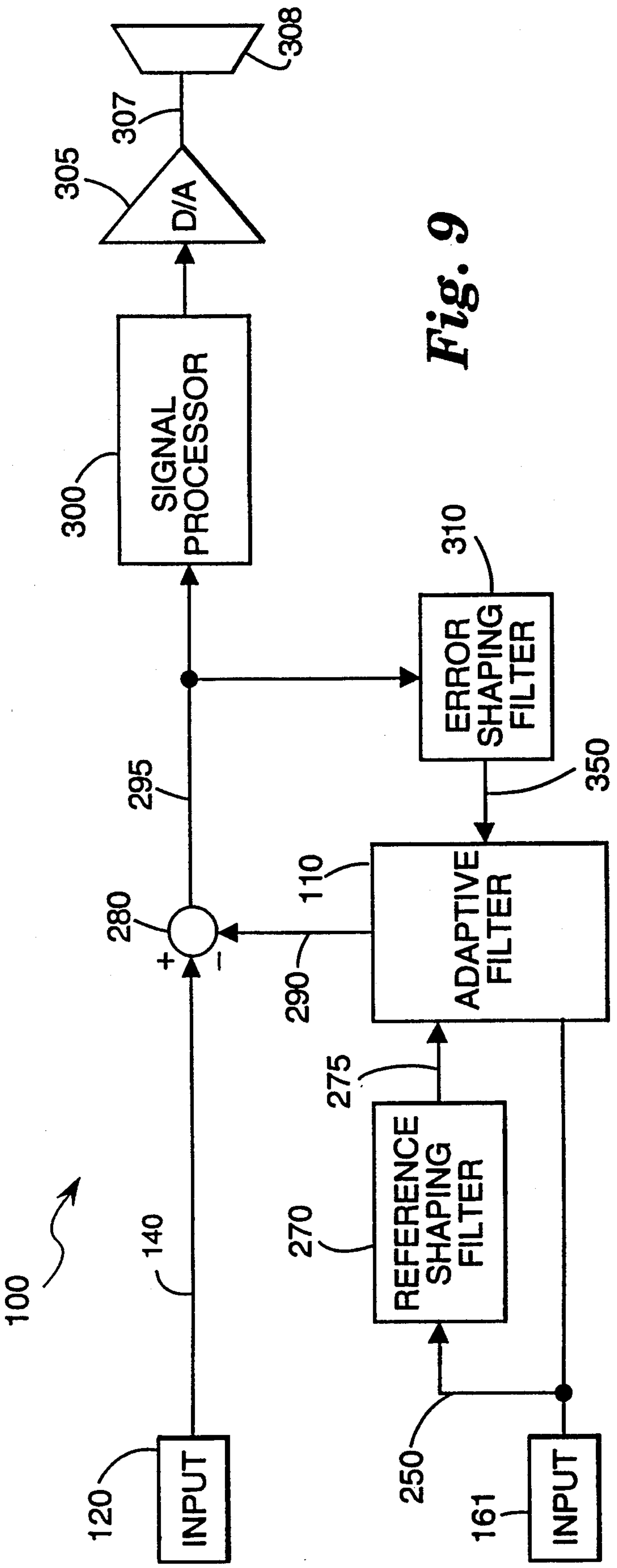
FIG. 9 is a block diagram of a two microphone implementation of the noise suppression apparatus of the present invention.

In an alternative implementation of the inventive noise suppression circuit illustrated in FIG. 9, a second microphone 161 is used instead of delay circuit 160 to provide the reference signal 250. Second microphone 161 will preferably be positioned so as to receive primarily only ambient noise energy and a minimum of audible speech. In this way the sampled version of the electrical signal generated by second microphone 161 will be substantially uncorrelated with the speech information inherent within sampled input signal 140, thus preventing significant speech cancellation from occurring during adaptive filtering. Microphone 120 and second microphone 161 will, however, typically be located within the same noise field such that at least some degree of correlation exists between noise energy within input signal 140 and reference signal 250 provided by second microphone 161.

Continuing in the description of FIGS. 1 and 9, delayed (with respect to FIG. 1) input signal 250 is also transmitted to reference shaping filter 270 disposed to provide focused reference signal 275 to adaptive filter 110. Reference shaping filter 270 is preferably realized as a finite impulse response (FIR) filter having a transfer characteristic which passes a noise spectrum desired to be removed from input signal 140, but does not pass most of the speech spectrum of interest. Noise from machinery and other distracting background noise is frequently concentrated at frequencies of less than one hundred Hertz, while the bulk of speech energy is present at higher audible frequencies. Accordingly, reference shaping filter 270 will preferably be of a low-pass variety having a cut-off frequency of less than, for example, several hundred Hertz. When an FIR implementation is employed, the tap weights included within reference shaping filter 270 may be determined from well-known FIR filter design techniques upon specification of the desired low-pass cut-off frequency. See, for example, U.S. Pat. No. 4,658,426, Chabries et al, Adaptive Noise Suppressor, the contents of which are hereby incorporated by reference.

Referring again to FIG. 1, an adapted signal 290 synthesized by adaptive filter 110 is supplied to signal combiner 280. Adapted signal 290, which characterizes the noise component of the input signal 140, is subtracted from input signal 140 by combiner 280 in order to provide a desired output signal 295 to signal processor 300. Signal processor 300 preferably includes a filtered amplifier circuit designed to increase the signal energy over a predetermined band of audio frequencies. In particular, signal processor 300 may be realized by one or more of the commonly available signal processing circuits available for processing digital signals in hearing aids, For example, signal processor 300 may include the filter-limit-filter structure disclosed in U.S. Pat. No. 4,548,082, Engebretson et al, the contents of which are hereby incorporated by reference. After desired output signal 295 has passed through signal processor 300, a digital to analog converter 305 converts resulting signal 302 into analog signal 307. Analog signal 307 drives output transducer 308 disposed to generate an acoustical waveform in response thereto.

Desired output signal 295 is also provided to error shaping filter 310 having a passband chosen to transmit the spectral noise range desired to be eliminated from input signal 140. Error shaping filter 310 is preferably a finite impulse response (FIR) filter having a transfer characteristic which passes a noise spectrum desired to be removed from input signal 140, but does not pass most of the speech spectrum of interest. Hence, error shaping filter 310 will preferably be of a low-pass variety having a cut-off frequency substantially identical to that to reference shaping filter 270 (i.e., of less than several hundred Hertz).

Figure 2:
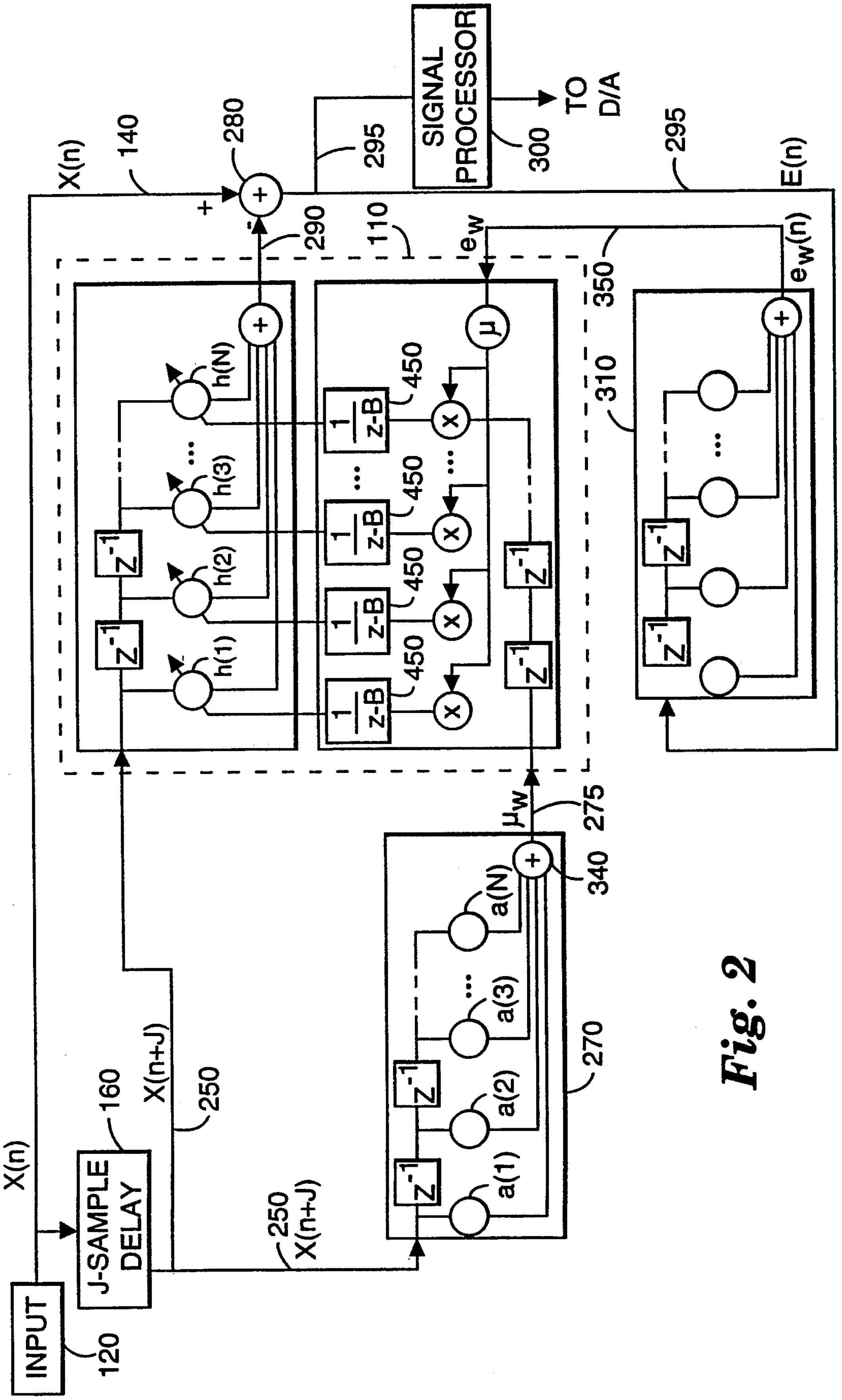
FIG. 2 shows a detailed block diagrammatic representation of the noise suppression apparatus of the present invention.

The noise suppression circuit 100 is depicted in greater detail within the block diagrammatic representation of FIG. 2. Referring to FIG. 2, samples x(n) of input signal 140 are initially delayed by processing the signals through J-sample delay 160. The samples of delayed input signal 250, denoted by x(n-J), are then further processed by reference shaping filter 270. As is described more fully below, the resultant stream of samples $U_w(n)$ of focused reference signal 275 along with the weighted error signal $e_w(n)$ of filtered error stream 350 computed during the preceding cycle of adaptive filter 110 are used to update tap weights h(n) within adaptive filter 110.

Subsequent to modification of the adaptive weights h(n), adaptive filter 110 processes samples x(n-J) in order to generate adaptive signal 290. In this way, adapted signal 290 is made available to combiner 280, which produces desired output signal 295 by subtracting samples of adapted signal 290 from samples x(n) of input signal 140. Desired output signal 295 is then supplied to error shaping filter 310 to allow computation of the samples $e_w(n)$ of filtered error stream 350 to be used during the next processing cycle of adaptive filter 110.

Figure 3:
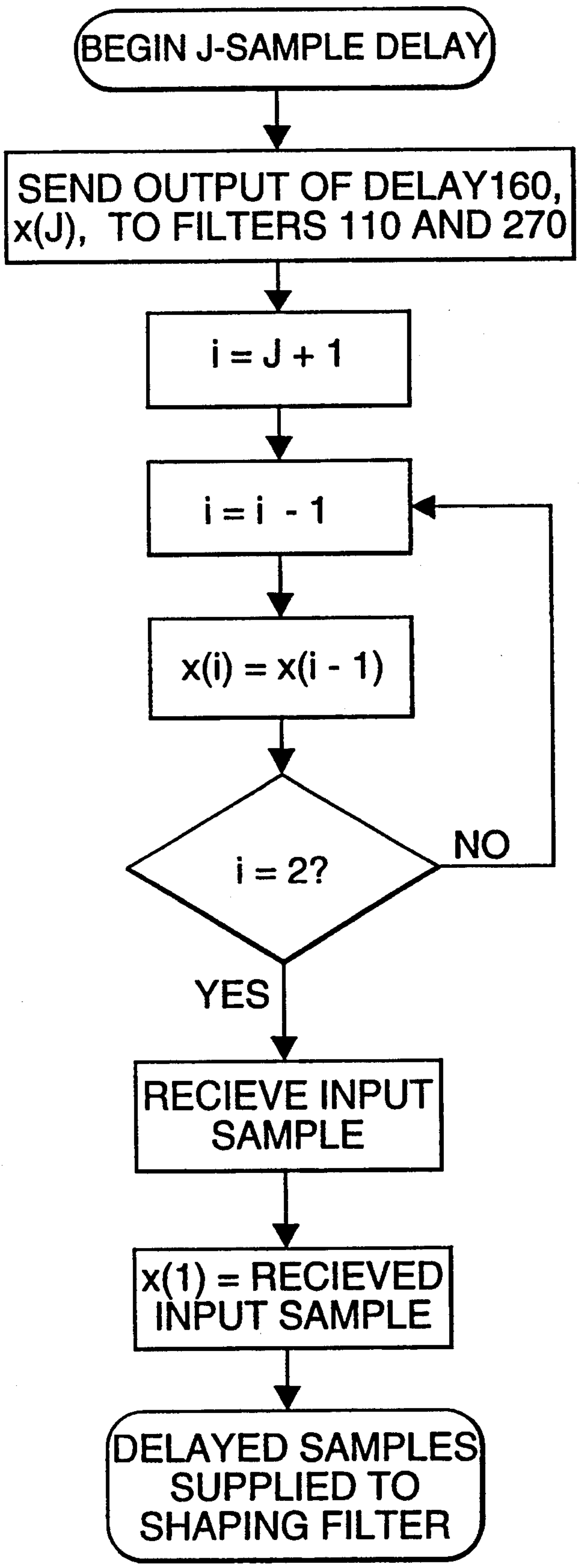
FIG. 3 is a flow chart illustrating the manner in which successive input samples to the inventive noise suppression circuit are delayed by an J-sample delay line.

The operation of noise suppression circuit 100 may be more specifically described with reference to the signal flow charts of FIGS. 3, 4, 5 and 6. In particular, the flow chart of FIG. 3 illustrates the manner in which successive samples of input signal 140 are delayed by J-sample delay 160. J-sample delay 160 is preferably implemented as a serial shift register, receiving samples from input signal 140 and outputting each received sample after J sample periods. As is indicated in FIG. 3, during each sampling period the "oldest" sample x(J) included in the shift register becomes the current sample of delayed input signal 250. The remaining values x(i) are then shifted one tap in the filter. The current sample of input signal 140 is stored as value x(1).

Figure 4:
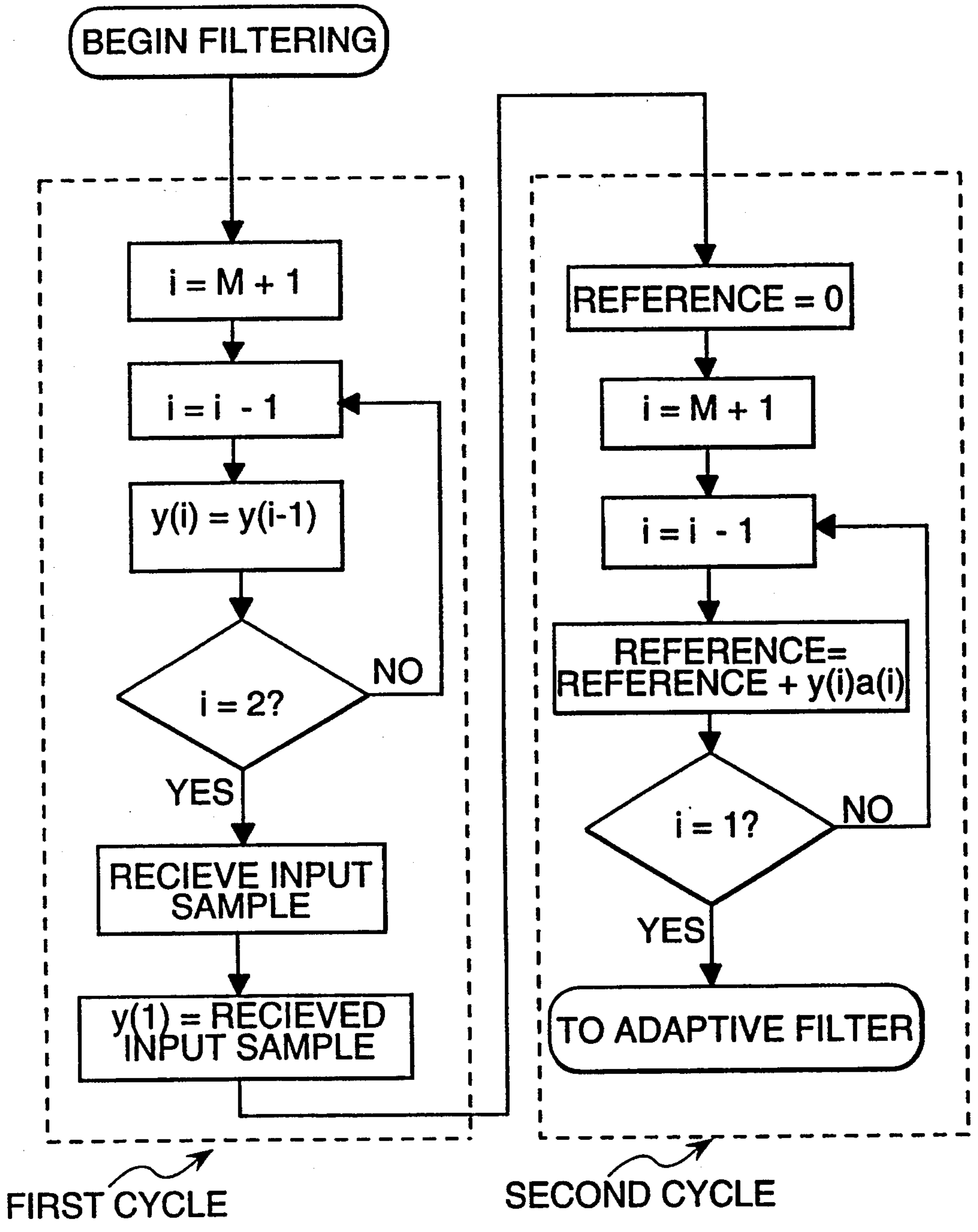
FIG. 4 depicts a flow chart outlining the manner in which an FIR implementation of a shaping filter processes a stream of delayed input samples produced by the J-sample delay line.

FIG. 4 depicts a flow chart outlining the manner in which an FIR implementation of reference shaping filter 270 processes the stream of samples of delayed input signal 250 using a series of tap positions. Referring to FIG. 4, during each sampling period, a first processing cycle is used to shift the existing data y(i) in reference shaping filter 270 by one tap position. As is typically the case, adjacent tap positions of reference shaping filter 270 are separated by single-unit delays (represented by the notation "$z^{-1}$" in FIG. 2). The current sample of delayed input signal 250 is placed in the first tap location y(1) of reference shaping filter 270. This first processing cycle is essentially identical to the update procedure for J-sample delay circuit 160 described above with reference to FIG. 3.

Referring to FIGS. 2 and 4, during a second cycle within the sample period, each filter sample y(i) is multiplied by a fixed tap weight a(i) having a value determined in accordance with conventional FIR filter design techniques. The sum of the tap weight multiplications is accumulated by M-input summer 340, which provides focused reference signal 275 supplied to adaptive filter 110.

Figure 5:
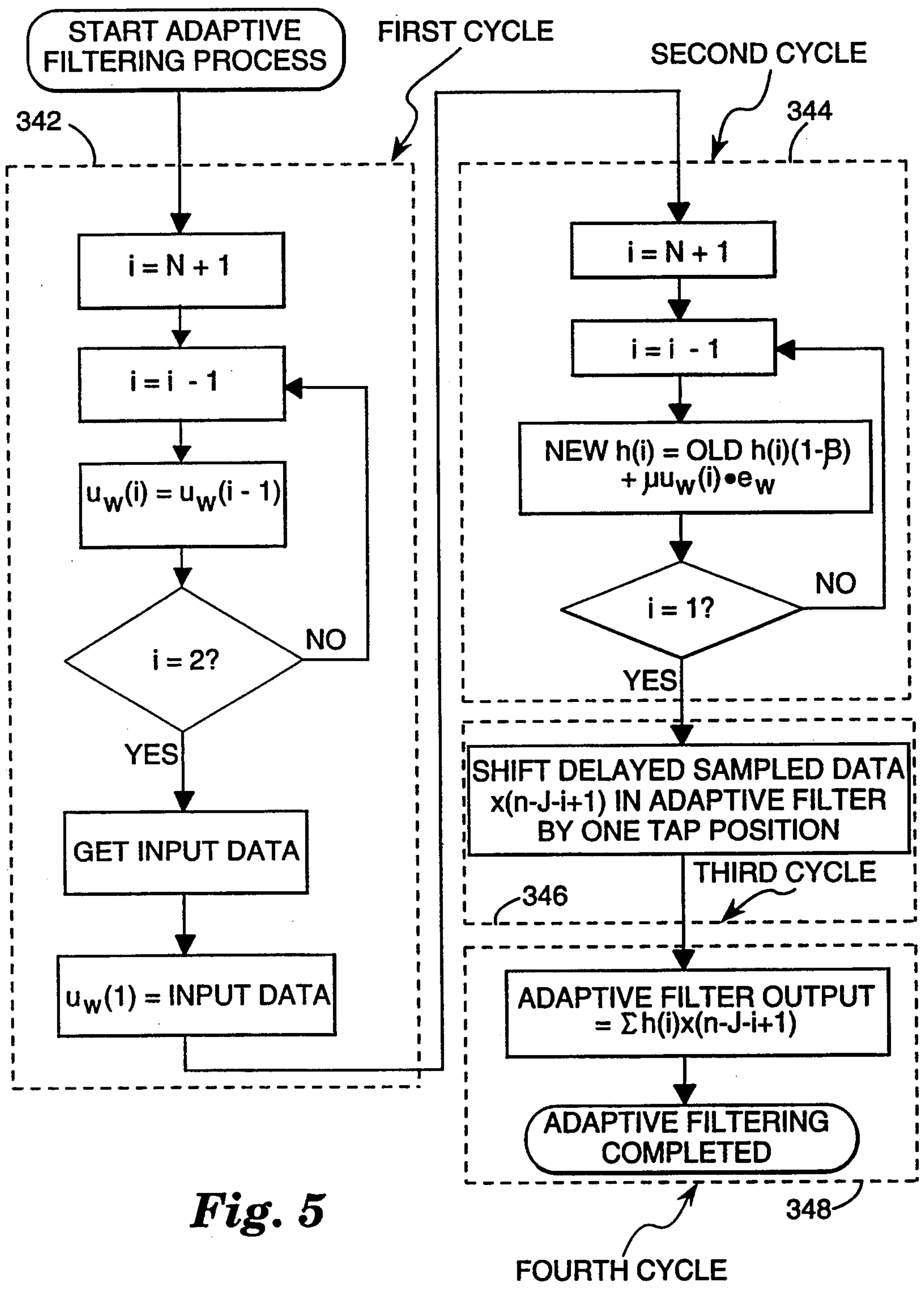
FIG. 5 is a flow chart illustrating the process by which an adaptive signal comprising a stream of samples y(n) is synthesized by an adaptive filter.

FIG. 5 is a flow chart illustrating the process by which the stream of samples y(n) (defined earlier with respect to FIG. 2) is synthesized by adaptive filter 110. During a first cycle 342 within each sample period the current sample of focused reference signal 275 is shifted into adaptive filter 110 as adaptive input sample $u_w(1)$, wherein the subscript w signifies the "spectrally weighted" shaping effected by reference shaping filter 270. The preceding N-1 reference samples are denoted as $u_w(2)$, $u_w(3)$, . . . $u_w(N)$, and are each shifted one tap location within adaptive filter 110 as the sample $u_w(1)$ is shifted in. Once this alignment process has occurred, a second cycle 344 is initiated wherein adaptive weights h(1), h(2), . . . h(N) are modified in accordance with the current value $e_w$ of the filtered error stream 350. As is explained more fully below, this updating process is carried out in accordance with the following recursion formula:

$$h(i)_{NEW} = h(i)_{OLD}(1-\beta) + \mu u_w(i) e_w \quad \text{(Equation 1)}$$

where (i) represents the $i^{th}$ component of adaptive filter 110, $\mu$ is an adaption constant determinative of the rate of convergence of adaptive filter 110, and $\beta$ is a real number between zero and one. The value of $\mu$ will preferably be chosen in the conventional manner such that adaptive filter 110 converges at an acceptable rate, but does not become overly sensitive to minor variations in the power spectra of input signal 140.

In a third cycle 346, the delayed samples x(n-J-i+1) in the N-tap delay line of adaptive filter 110 are shifted by one tap position, and in a fourth cycle 348 the updated adaptive filter weights h(i) are multiplied by the delayed samples x(n-J-i+1) and summed to generate the current sample of adapted signal 290 as output from adaptive filter 110. The index "n-J-i+1" for the delayed samples indicates the J sample period delay associated with J-sample delay 160, plus the delay associated with adaptive filter 110.

Equation (1) above is based on a "leaky least means square" error minimization algorithm commonly understood by those skilled in the art and more fully described in Haykin, *Adaptive Filter Theory,* Prentice-Hall (1986), p. 261, which is incorporated herein by reference. This choice of adjustment algorithm allows that, in the absence of input, the filter coefficients of adaptive filter 110 will adjust to zero. In this way adaptive filter 110 is prevented from self-adjusting to remove components from input signal 140 not included within the passband of reference shaping filter 270 and error shaping filter 310. Those skilled in the art will recognize that other adaptive filters and algorithms could be used within the scope of the invention. For example, a conventional least means square (LMS) algorithm such as is described in Widrow, et al., *Adaptive Noise Canceling: Principles and Applications,* Proceedings of the IEEE, 63(12), 1692-1716 (1975), which is incorporated herein by reference, may be employed in conjunction with a low-pass post-filter network 380 shown in FIG. 6. The filter network 380 serves to minimize the possibility that filtering characteristics will be developed based on information included within the frequency spectrum outside of the passband of reference shaping filter 270 and error shaping filter 310.

Figure 6:
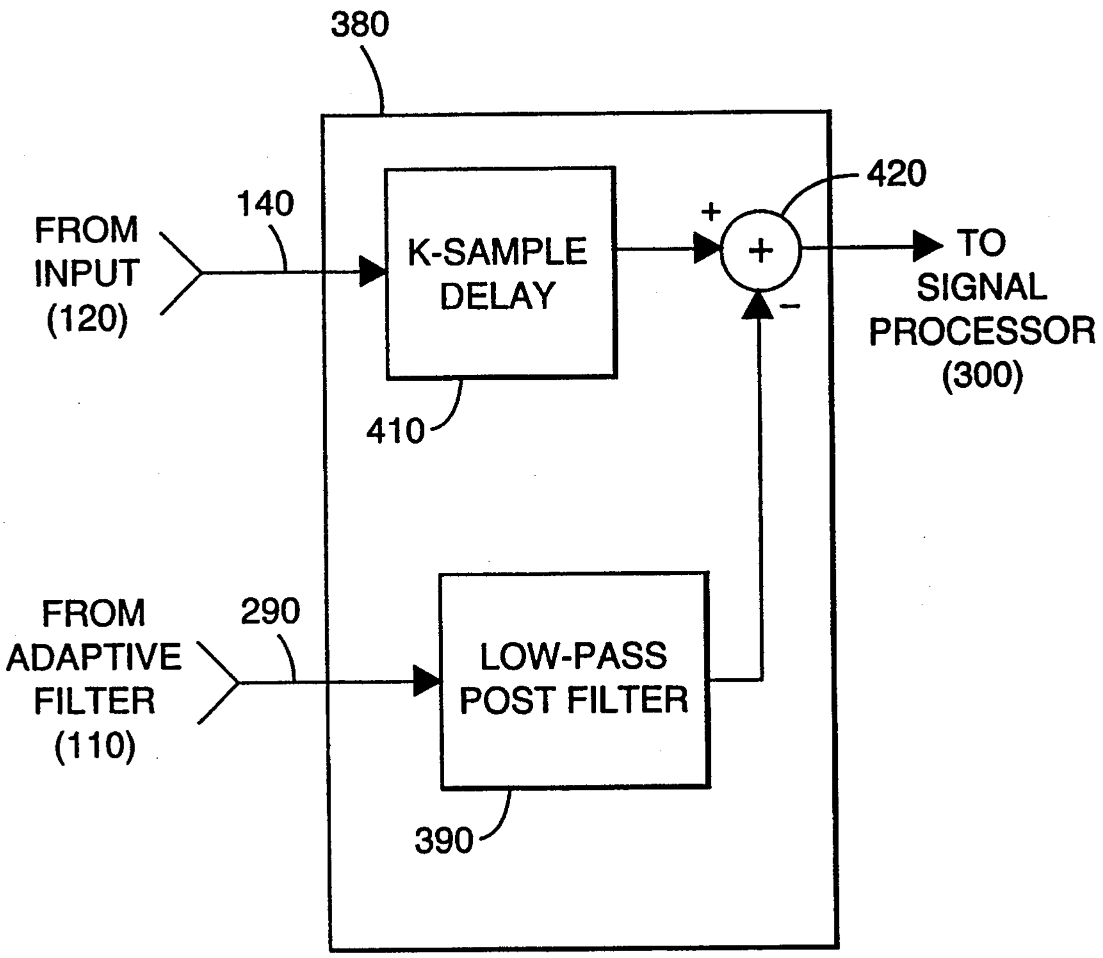
FIG. 6 is a block diagrammatic representation of an optional post-filter network coupled to the adaptive filter.

As is indicated by FIG. 6, the filter network 380 includes a low-pass filter 390 addressed by adaptive signal 290. Low pass filter 390 preferably has a low-pass transfer characteristic and, preferably is substantially similar to those of reference shaping filter 270 and error shaping filter 310. Filter network 380 further includes a K-sample delay 410 coupled to input signal 140 for providing a delay equivalent to that of low pass filter 390. Summation node 420 subtracts the output of low pass filter 390 from that of K-sample delay 410 and provides the difference to signal processor 300.

In conventional adaptive filtering schemes implementing some form of the LMS algorithm, the coefficients of the adaptive filter are updated to minimize the expected value of the squared difference between input and reference signals over the entire system bandwidth. In contrast, reference shaping filter 270 and error shaping filter 310 of the present invention focus adaptive cancellation over a desired spectral range. Specifically, reference shaping filter 270 and error shaping filter 310 are $M^{th}$-order FIR spectral shaping filters and may be represented by coefficient vector W:

$$W=[w(1), w(2), \ldots w(M)]^T, \quad \text{(Equation 2)}$$

where T denotes the vector transpose. The difference between the stream of samples x(n) from input signal 140 and the stream of samples y(n) from adapted signal 290 may be represented by error vector E(n), in which $$E(n)=[e(n), e(n-1), \ldots e(n-M+1)]^T \quad \text{(Equation 3)}$$

which represents the set of error values stored in delay line 420 of error shaping filter 310. Filtered error stream 350 (FIG. 2) is spectrally weighted and the expected mean-square of which it is desired to minimize, is given by $$e_w(n)=[W]^T \cdot E(n). \quad \text{(Equation 4)}$$

The coefficient vector H=[h(1), h(2), . . . h(N)] of the adaptive filter 110 which minimizes the expectation of the square of Equation 4 may be represented as $$H=E\{[U_w(n)\cdot[U_w(n)]^T]^{-1}\}\cdot E\{x_w(n)\cdot U_w(n)\} \quad \text{(Equation 5)}$$

where $x_w(n)$ is a weighted sum of the samples of input signal 140, defined as $$x_w(n)=[W]^T \cdot X(n), \quad \text{(Equation 6)}$$

where $$X(n)=[x(n), x(n-1), \ldots x(n-M+1)]^T. \quad \text{(Equation 7)}$$

In Equation 5, $U_w(n)$ denotes the vector of the spectrally weighted samples of focused reference signal 275, where $$U_w(n)=[u_w(n), u_w(n-1), \ldots u_w(n-N+1)]^T, \text{ and} \quad \text{(Equation 8)}$$

$$u_w(n)=[W]^T \cdot U(n), \quad \text{(Equation 9)}$$

in which U(n) represents the stream of samples from delayed input signal 250.

Equations 2 through 9 describe the parameters included within the spectrally weighted LMS update algorithm of Equation 1 (see above). The adaptive weights h(i) of adaptive filter 110 are modified each sample period by the factor B, wherein $B=1-\beta$, via scaling blocks 450 (FIG. 2) in order to implement the "leaky" LMS algorithm given by Equation 1.

It is noted that the primary signal processing path, which includes input 120 as well as signal processor 300 and output transducer 308, is uninterrupted except for the presence of signal combiner 280. That is, the reference and error time sequences to adaptive filter 110 are shaped without corrupting the primary signal path with the finite precision weighting filters typically required in the implementation of conventional frequency-weighted noise-cancellation approaches.

Figure 7:
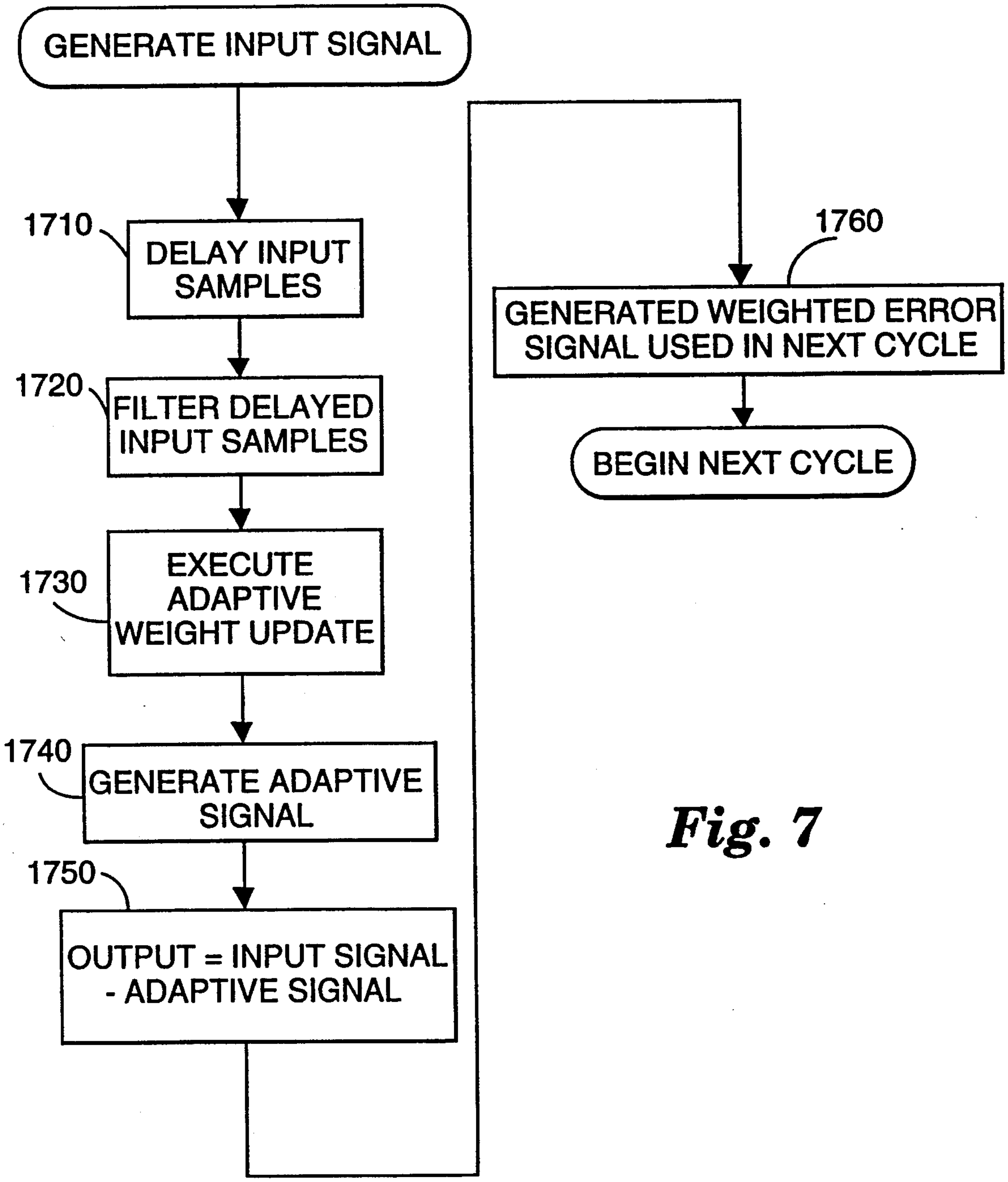
FIG. 7 depicts a top-level flow chart describing operation of the noise suppression apparatus of the present invention.

FIG. 7 depicts a top-level flow chart describing operation of noise suppression circuit 100. In the following discussion the term "execute" implies that one of the operative sequences described with reference to FIGS. 3, 4 and 5 is performed in order to accomplish the indicated function. Referring to FIGS. 2 and 7, the current sample of input signal 140 is initially delayed (1710) by processing the signal through J-sample delay 160. The samples of delayed input signal 250 are then further processed (1720) by reference shaping filter 270. The resultant stream of samples of focused reference signal 275 along with the weighted error signal of filtered error stream 350 computed during the preceding cycle of adaptive filter 110 enable execution of the adaptive weight update routine (1730).

As is indicated by FIG. 7, subsequent to modification of the adaptive weights, adaptive filter 110 processes (1740) delayed input signal 250 in order to generate adaptive signal 290. In this way, adapted signal 290 is made available to combiner 280, which produces desired output signal 295 by subtracting (1750) adapted signal 290 from input signal 140. Desired output signal 295 is then supplied to error shaping filter 310 to allow computation (1760) of filtered error stream 350 to be used during the next processing cycle of adaptive filter 110. The process described with reference to FIG. 7 occurs during each sample period, at which time a new sample of input signal 140 is provided by input 120 and a new desired output signal 295 is supplied to signal processor 300.

Feedback Suppression Circuit

Figure 8:
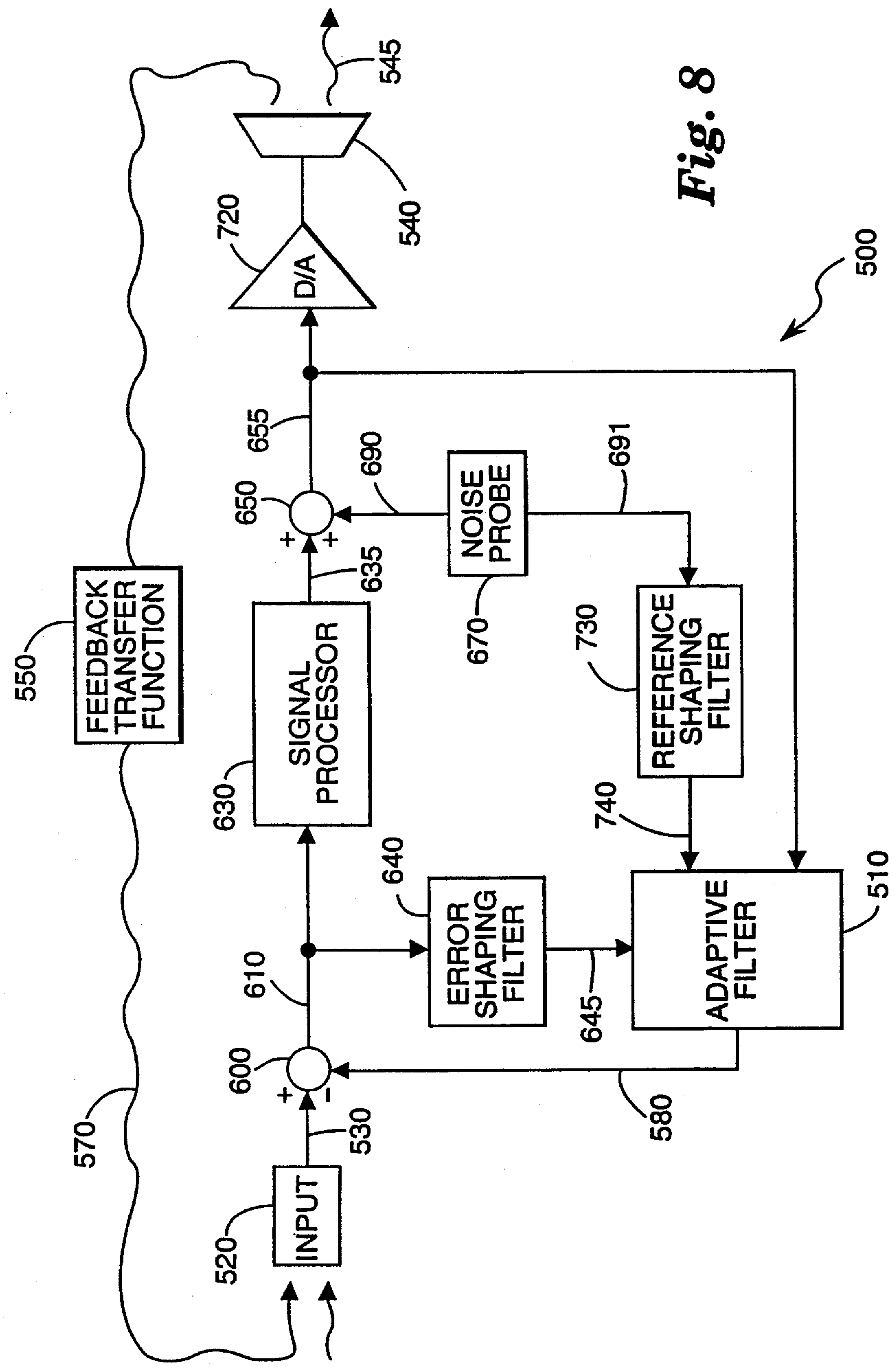
FIG. 8 is a block diagram depiction of the feedback suppression apparatus of the present invention as it would be embodied in an auditory prosthesis.

FIG. 8 shows a feedback suppression circuit 500 in accordance with the present invention, adapted for use in a hearing aid (not shown). Feedback suppression circuit 500 uses a time-domain method for substantially canceling the contribution made by undesired feedback energy to incident audio input signals. As is described more fully below, the feedback suppression band of adaptive filter 510 included within feedback suppression circuit 500 is defined by selectively pre-filtering filtered reference noise signal 740 and filtered error signal 645 provided to adaptive filter 510. This signal shaping focuses the circuit's feedback cancellation capability on the frequency band of interest (e.g. 3 to 5 kiloHertz), thus resulting in efficient utilization of the resources of adaptive filter 510. In this way, the principles underlying operation of feedback suppression circuit 500 are seen to be substantially similar to those incorporated within noise suppression circuit 100 shown in FIG. 1, with specific implementations of each circuit being disposed to reduce undesired signal energy over different frequency bands.

Referring to FIG. 8, feedback suppression circuit 500 has an input 520 which may be any conventional source of an input signal including, for example, a microphone and signal processor. A microphone (not shown) preferably included within input 520 generates an electrical input signal 530 from sounds external to the user of the hearing aid, from which is synthesized an output signal used by output transducer 540 to emit filtered and amplified sound 545. Input 520 also includes an analog to digital converter (not shown) so that input signal 530 is a digital signal. As is indicated by FIG. 8, some of the sound 545 emitted by output transducer 540 returns to the microphone within input 520 through various feedback paths generally characterized by feedback transfer function 550. Feedback signal 570 is a composite representation of the aggregate acoustical feedback energy received by input 520.

Adaptive output signal 580 generated by adaptive filter 510 is subtracted from input signal 530 by input signal combiner 600 in order to produce a feedback canceled signal 610. Feedback canceled signal 610 is supplied both to signal processor 630 and to error shaping filter 640. Signal processor 630 preferably is implemented in the manner described above with reference to signal processor 300 of noise cancellation circuit 100. Output 635 of signal processor 630 is added at summation node 650 to broadband noise signal 690 generated by noise probe 670. Composite output signal 655 created at summation node 650 is provided to digital-to-analog converter 720 and adaptive filter 510. The output of digital-to-analog converter 720 is submitted to output transducer 540.

Noise probe 690 also supplies noise reference input 691 to reference shaping filter 730 which in turn is coupled to adaptive filter 510. Broadband noise signal 690 and noise reference signal 691 generated by noise probe 670 are preferably identical, and ensure that adaptive operation of feedback cancellation circuit 500 is sustained during periods of silence or minimal acoustical input. Specifically, the magnitude of broadband noise signal 690 provided to summation node 650 should be large enough to ensure that at least some acoustical energy is received by input 520 (as a feedback signal 570) in the absence of other signal input. In this way, the weighting coefficients within adaptive filter 510 are prevented from "floating" (i.e. from becoming randomly arranged) during periods of minimal audio input. Noise probe 670 may be conventionally realized with, for example, a random number generator operative to provide a random sequence corresponding to a substantially uniform, wideband noise signal. The broadband noise signal 690 can be provided at a level below the auditory threshold of users, usually significantly hearing-impaired users, and is perceived as a low-level white noise sound by those afflicted with less severe hearing losses.

When noise probe 670 is operated, a faster convergence of adaptive filter 510 generally can be obtained by breaking the main signal path by temporarily disconnecting the output of signal processor 630 from combiner 650.

Figure 10:
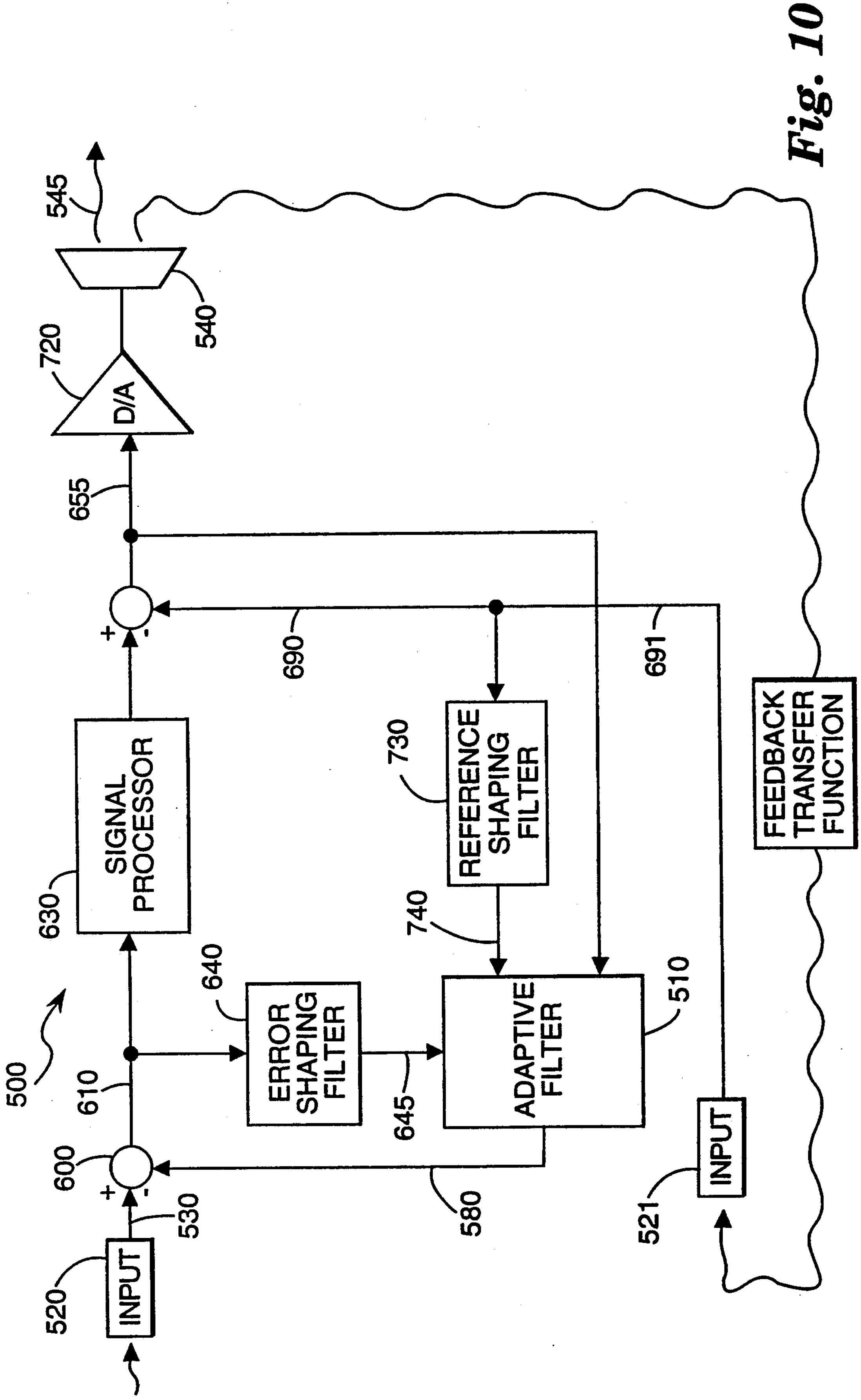
FIG. 10 is a block diagram of a two microphone implementation of the feedback suppression apparatus of the present invention.

Alternatively as shown in FIG. 10, second microphone 521 may be used in lieu of the noise probe 670 to provide the reference signals 690 and 691. As was discussed with reference to FIG. 9, such second microphone 521 will preferably be positioned a sufficient far from the microphone preferably included within input 520 to prevent cancellation of speech energy within input signal 530.

Continuing with reference to FIGS. 8 and 10, filtered reference noise signal 740 applied to modify the weights of adaptive filter 510 is created by passing noise reference signal 691 through reference shaping filter 730. Error shaping filter 640 and reference shaping filter 730 preferably will be realized as finite impulse response (FIR) filters governed by a transfer characteristic formulated to pass a feedback spectrum (e.g., 3 to 5 kiloHertz) desired to be removed from input signal 530. Because the speech component of input signal 530 is not present within reference noise signal 691, the speech energy within input signal 530 will be uncorrelated with adaptive output signal 580 synthesized by adaptive filter 510 from noise reference signal 691. As a consequence, the speech component of input signal 530 is left basically intact subsequent to combination with adaptive output signal 580 at signal combiner 600 irrespective of the extent to which shaping filters (640 and 730) transmit signal energy within the frequency realm of intelligent speech. This enables the transfer characteristics of the shaping filters (640 and 730) to be selected in an unconstrained manner to focus the feedback cancellation resources of the feedback suppression circuit 500 over the spectral range in which the gain in feedback transfer function 550 is the largest.

Determination of feedback transfer function 550 may be accomplished empirically by transmitting noise energy from the location of output transducer 540 and measuring the acoustical waveform of feedback signal 570 received at input 520.

Alternatively, feedback transfer function 550 may be analytically estimated when particularized knowledge is available with regard to the acoustical characteristics of the environment between output transducer 540 and input 520. For example, information relating to the acoustical properties of the human ear canal and to the specific physical structure of the hearing aid could be utilized to analytically determine feedback transfer function 550.

Figure 11:
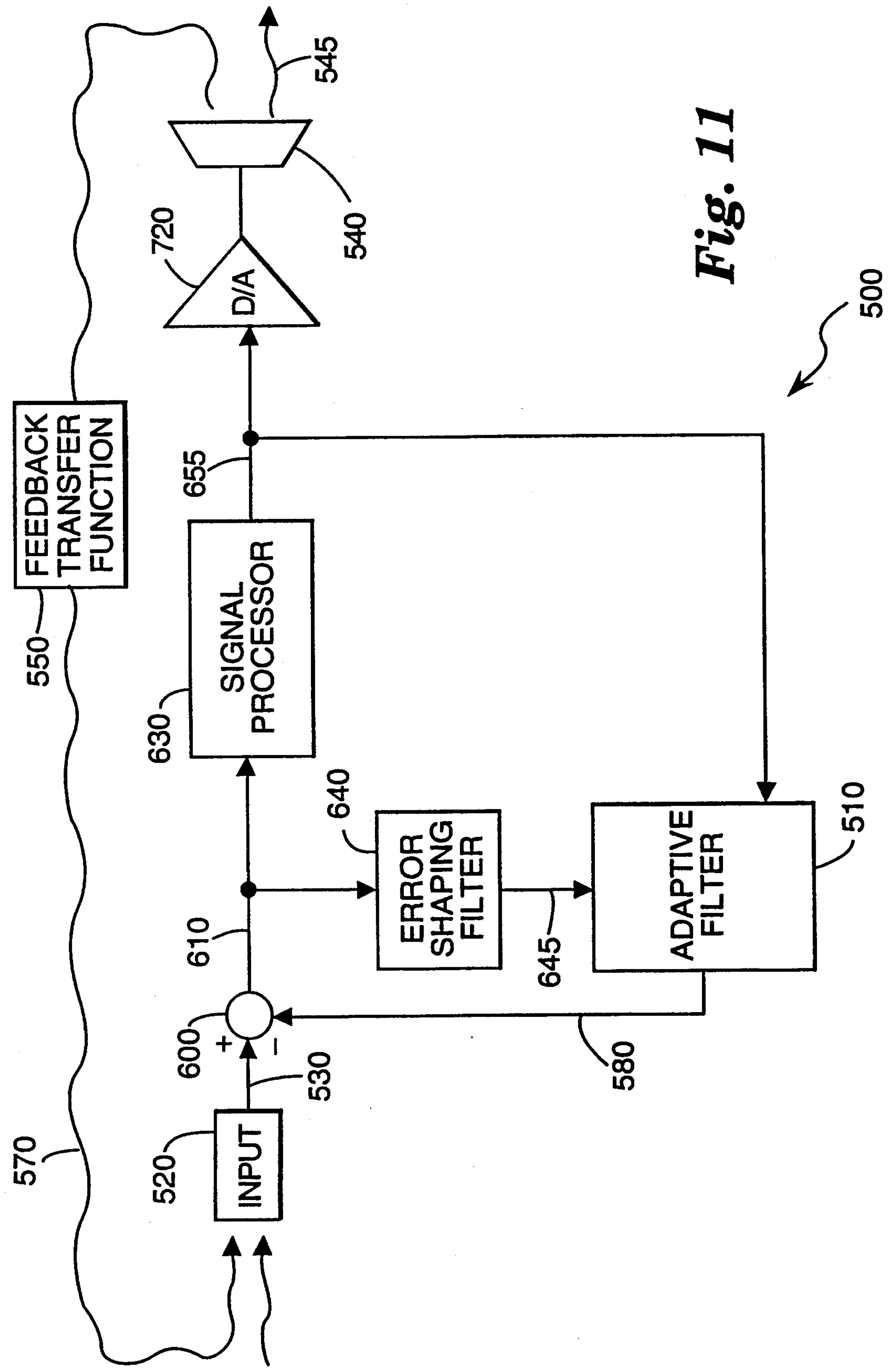
FIG. 11 is a block diagram of an alternative embodiment of the feedback suppression apparatus of the present invention.

FIG. 11 illustrates an alternative embodiment of the feedback suppression apparatus of the present invention. Since the feedback suppression apparatus previously illustrated in FIG. 8 typically may be used in environments having a level of noise, it is possible in some circumstances to eliminate the noise probe generator 670 of FIG. 8. As illustrated in FIG. 11, eliminating the noise probe generator enables adaptive filter 510 to rely of presence of some noise in the output 655 of signal processor 630 in frequency band of interest. Adaptive filter 510 adapts only to error shaping filter 640, which focuses the adaptive energy of adaptive filter 510 to the portion of incoming signal containing the feedback component, and to signal 655 output from signal processor 630. Output 655 of signal processor 630 is fed directly to the input of adaptive filter 510 and to digital-to-analog converter 720.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, algorithms other than the LMS filter algorithm may be used to control the adaptive filters included within noise suppression circuit 100 and feedback cancellation circuit 500. Similarly, shaping filters (270, 310, 640 and 730) may be tuned so as to focus adaptive filtering to eliminate undesired signal energy over spectral ranges other than those disclosed herein.

What is claimed is:

1. A noise suppression apparatus for processing an audio input signal having both a desired component and an undesired component, comprising:
   - first filter means operatively coupled to said input signal for generating a reference signal by selectively passing an audio spectrum of said input signal containing primarily said undesired component;
   - adaptive filter means operatively coupled to said input signal and to said reference signal for adaptively filtering said input signal in order to provide an adaptive filter output signal;
   - combining means operatively coupled to said input signal and to said adaptive filter output signal for combining said adaptive filter output signal with said input signal to cancel said undesired component from said input signal and produce an error signal; and
   - second filter means receiving said error signal for selectively passing to said adaptive filter means an audio spectrum of said error signal corresponding to said undesired component of said input signal;
     said adaptive filter means being controlled in accordance with a signal filtering algorithm that employs both said input signal selectively passed by said first filter and said selectively passed error signal;
   - whereby said undesired component is effectively removed from said input signal without substantially affecting said desired component of said input signal.

2. The apparatus of claim 1 further including decorrelation means inserted between said input signal and said first filter means, and between said input signal and said adaptive filter means, for decorrelating said input signal from said adaptive filter output signal.

3. The apparatus of claim 2 wherein said decorrelation means comprises a signal delay circuit that delays transmission of said input signal.

4. The apparatus of claim 3 wherein said input signal comprises a digital signal obtained by sampling an analog signal during successive sample periods, and wherein said signal delay circuit delays transmission of said digital signal by at least four of said sample periods.

5. The apparatus of claim 1 wherein said adaptive filter means is a FIR filter having a set of filter coefficients and means for periodically updating said filter coefficients, in accordance with values of said reference signal and a portion of said error signal passed by said second filter means, so as to minimize a predefined least means square error value.

6. The apparatus of claim 5 wherein said adaptive filter means further includes a low-pass post-filter network, said post-filter network including:
   - means for delaying said input signal,
   - a low-pass filter addressed by said adaptive filter output signal, and
   - a difference node operatively coupled to'said delayed input signal and to an output of said low-pass filter.

7. The apparatus of claim 1 wherein said adaptive filter means is a FIR filter having filter coefficients h(i) and coefficient updating means for updating said filter coefficients in accordance with a leaky least means square update function of the form:

$$h_{new}(i)=(1-\beta)h_{old}(i)+\mu u_2(i)e_w$$

wherein $\mu$ is an adaptation constant, $\beta$ is a real number between zero and one, $h_{new}(i)$ represents an $i^{th}$ filter coefficient's updated value, $h_{old}(i)$ represents said $i^{th}$ filter coefficient's previous value, $u_w(i)$ denotes an $i^{th}$ sample of the reference signal, and $e_w$ denotes the portion of said error signal passed by said second filter means.

8. The apparatus of claim 1 wherein spectral energy included within said undesired component, within said reference signal, and within said filtered error signal is generally confined to frequencies below 1 kiloHertz.

9. For use in an audio system having microphone means for generating an input signal from sounds external to said system and transducer means for emitting sound in response to an output signal provided by signal processing means, wherein a portion of the sound emitted by said transducer means propagates to the microphone means to add a feedback signal to the input signal, a feedback suppression apparatus comprising:
   - probe means for generating a noise signal, said noise signal being injected into said output signal;
   - combining means operatively coupled to said input signal and to an adaptive filter output signal for subtracting said adaptive filter output signal from said input signal so as to substantially cancel said feedback signal from said input signal and to generate an error signal that is input into said signal processing means;

first filter means operatively coupled to said error signal for generating a filtered error signal by selectively passing an audio spectrum of said error signal corresponding to said feedback signal's audio spectrum;

adaptive filter means operatively coupled to said filtered error signal for generating said adaptive filter output signal and for providing said adaptive filter output signal to said combining means; and second filter means for selectively passing to said adaptive filter means an audio spectrum of said noise signal corresponding to said feedback signal's audio spectrum.

10. The apparatus of claim 9 wherein said first and second filter means respectively include first and second FIR filters having passbands encompassing the spectral range between 3 and 5 kiloHertz.

11. The apparatus of claim 9 wherein said adaptive filter means is a FIR filter having a set of filter coefficients and including means for periodically updating said filter coefficients, in accordance with values of said filtered error signal and a portion of said noise signal passed by said second filter means, so as to minimize a predefined least means square error value.

12. The apparatus of claim 9 wherein said adaptive filter means is a FIR filter having filter coefficients h(i) and coefficient updating means for updating said filter coefficients in accordance with a leaky least means square update function of the form:

$$h_{new}(i)=(1-\beta)h_{old}(i)+\mu u_w(i)e_w$$

wherein $\mu$ is an adaptation constant, $\beta$ is a real number between zero and one, $h_{new}(i)$ represents an $i^{th}$ filter coefficient's updated value, $h_{old}(i)$ represents said $i^{th}$ filter coefficient's previous value, $u_w(i)$ denotes an $i^{th}$ sample of the reference signal, and $e_w$ denotes the portion of said error signal passed by said second filter means.

13. The apparatus of claim 9 wherein spectral energy included within said filtered error signal is generally confined to frequencies between 3 and 5 kiloHertz.

14. The apparatus of claim 9 wherein said probe means includes a random number generator for introducing a sequence of random numbers into said noise signal.

15. An auditory prosthesis disposed to process acoustical signal energy, comprising:

a microphone for generating an audio input signal in response to said acoustical signal energy, said input signal having both a desired component and an undesired component;

first filter means operatively coupled to said input signal for generating a reference signal by selectively passing an audio spectrum of said input signal containing primarily said undesired component;

adaptive filter means operatively coupled to said input signal and to said reference signal for adaptively filtering said input signal in order to provide an adaptive filter output signal;

combining means operatively coupled to said input signal and to said adaptive filter output signal for combining said adaptive filter output signal with said input signal to cancel said undesired component from said input signal and produce an error signal;

second filter means operatively coupled to said error signal for selectively passing to said adaptive filter means an audio spectrum of said error signal corresponding to said undesired component of said input signal;

said adaptive filter means being controlled in accordance with a signal filter algorithm that employs both said reference signal and a portion of said error signal passed by said second filter means;

a signal processor having an input coupled to said error signal and producing an desired output signal;

output transducer means for emitting sound in response to said desired output signal;

whereby said undesired component is effectively removed from said input signal without substantially affecting said desired component of said input signal.

16. The auditory prosthesis of claim 15 further including decorrelation means inserted between said input signal and said first filter means, and between said input signal and said adaptive filter means, for decorrelating said input signal from said adaptive filter output signal.

17. The auditory prosthesis of claim 16 wherein said decorrelation means comprises a signal delay circuit that delays transmission of said input signal.

18. The auditory prosthesis of claim 17 wherein said input signal comprises a digital signal obtained by sampling an analog signal during successive sample periods, and wherein said signal delay circuit delays transmission of said digital signal by at least four of said sample periods.

19. The auditory prosthesis of claim 15 wherein said adaptive filter means is a FIR filter having a set of filter coefficients and including means for periodically updating said filter coefficients, in accordance with values of said reference signal and a portion of said error signal passed by said second filter means, so as to minimize a predefined least means square error value.

20. The auditory prosthesis of claim 19 wherein said adaptive filter means further includes a low-pass post-filter network, said post-filter network including:

means for delaying said input signal, a low-pass filter addressed by said adaptive filter output signal, and a difference node operatively coupled to said delayed input signal and to an output of said low-pass filter.

21. The auditory prosthesis of claim 15 wherein said adaptive filter means is a FIR filter having filter coefficients h(i) and coefficient updating means for updating said filter coefficients in accordance with a leaky least means square update function of the form:

$$h_{new}(i)=(1-\beta)h_{old}(i)+\mu u_w(i)e_w$$

wherein $\mu$ is an adaptation constant, $\beta$ is a real number between zero and one, $h_{new}(i)$ represents an $i^{th}$ filter coefficient's updated value, $h_{old}(i)$ represents said $i^{th}$ filter coefficient's previous value, $u_w(i)$ denotes an $i^{th}$ sample of the reference signal, and $e_w$ denotes the portion of said error signal passed by said second filter means.

22. The auditory prosthesis of claim 15 wherein spectral energy included within said undesired component, within said reference signal, and within said filtered error signal is generally confined to frequencies below 1 kiloHertz.

23. An auditory prosthesis comprising:

microphone means for generating an input signal from sounds external to said prosthesis;

transducer means for emitting sound in response to an output signal, wherein a portion of the sound emitted by said transducer means propagates to the microphone means to add a feedback signal to the input signal;

signal processing means for producing said output signal;

probe means for generating a noise signal, said noise signal being injected into said output signal;

combining means operatively coupled to said input signal and to an adaptive filter output signal for subtracting said adaptive filter output signal from said input signal so as to substantially cancel said feedback signal from said input signal and to generate an error signal that is input into said signal processing means;

first filter means operatively coupled to said error signal for generating a filtered error signal by selectively passing an audio spectrum of said error signal corresponding to said feedback signal's audio spectrum;

second filter means for selectively passing an audio spectrum of said noise signal corresponding to said feedback signal's audio spectrum; and adaptive filter means operatively coupled to said audio spectrum of said noise signal from said second filter means and to said filtered error signal for generating said adaptive filter output signal and for providing said adaptive filter output signal to said combining means.

24. The auditory prosthesis of claim 23 wherein said first and second filter means respectively include first and second FIR filters having passbands encompassing the spectral range between 3 and 5 kiloHertz.

25. The auditory prosthesis of claim 23 wherein said adaptive filter means is a FIR filter having a set of filter coefficients and means for periodically updating said filter coefficients, in accordance with values of said filtered error signal and a portion of said noise signal passed by said second filter means, so as to minimize a predefined least means square error value.

26. The auditory prosthesis of claim 23 wherein said adaptive filter means is a FIR filter having filter coefficients h(i) and coefficient updating means for updating said filter coefficients in accordance with a leaky least means square update function of the form:

$$h_{new}(i)=(1-\beta)h_{old}(i)+\mu u_w(i)e_w$$

wherein $\mu$ is an adaptation constant, $\beta$ is a real number between zero and one, $h_{new}(i)$ represents an $i^{th}$ filter coefficient's updated value, $h_{old}(i)$ represents said $i^{th}$ filter coefficient's previous value, $u_w(i)$ denotes an $i^{th}$ sample of the filtered error signal, and $e_w$ denotes the portion of said error signal passed by said second filter means.

27. The auditory prosthesis of claim 23 wherein spectral energy included within said feedback component and within said filtered error signal is generally confined to frequencies between 3 and 5 kiloHertz.

28. The auditory prosthesis of claim 23 wherein said probe means includes a random number generator for introducing a sequence of random numbers into said noise signal.

29. For use in an audio system having input microphone means for generating an input signal from sounds external to said system and transducer means for emitting sound in response to an output signal provided by signal processing means, wherein a portion of the sound emitted by said transducer means propagates to the input microphone means to add a feedback signal to the input signal, a feedback suppression apparatus comprising:

reference microphone means responsive to said feedback signal for generating a noise signal, said noise signal being injected into said output signal;

combining means operatively coupled to said input signal and to an adaptive filter output signal for subtracting said adaptive filter output signal from said input signal so as to substantially cancel said feedback signal from said input signal and to generate an error signal that is input into said signal processing means;

first filter means operatively coupled to said error signal for generating a filtered error signal by selectively passing an audio spectrum of said error signal corresponding to said feedback signal's audio spectrum;

second filter means for selectively passing an audio spectrum of said noise signal corresponding to said feedback signal's audio spectrum; and adaptive filter means operatively coupled to said audio spectrum of said noise signal and to said filtered error signal for generating said adaptive filter output signal and for providing said adaptive filter output signal to said combining means.

30. For use in an audio system having microphone means for generating an input signal from sounds external to said system and transducer means for emitting sound in response to an output signal provided by signal processing means, wherein a portion of the sound emitted by said transducer means propagates to the microphone means to add a feedback signal to the input signal, a feedback suppression apparatus comprising:

combining means operatively coupled to said input signal and to an adaptive filter output signal for subtracting said adaptive filter output signal from said input signal so as to substantially cancel said feedback signal from said input signal and to generate an error signal that is input into said signal processing means;

filter means operatively coupled to said error signal for generating a filtered error signal by selectively passing an audio spectrum of said error signal corresponding to said feedback signal's audio spectrum;

adaptive filter means operatively coupled to said filtered error signal for generating said adaptive filter output signal and for providing said adaptive filter output signal to said combining means.

31. The apparatus of claim 30 wherein said filter means comprise an FIR filter having a passband encompassing the spectral range between 3 and 5 kiloHertz.

32. The apparatus of claim 30 wherein said adaptive filter means is a FIR filter having a set of filter coefficients and including means for periodically updating said filter coefficients, in accordance with values of said filtered error signal and a portion of said error signal passed by said filter means, so as to minimize a predefined least means square error value.

33. The apparatus of claim 30 wherein said adaptive filter means is a FIR filter having filter coefficients h(i) and coefficient updating means for updating said filter coefficients in accordance with a leaky least means square update function of the form:

$$h_{new}(i)=(1-\beta)h_{old}(i)+\mu u_w(i)e_w$$

wherein $\mu$ is an adaptation constant, $\beta$ is a real number between zero and one, $h_{new}(i)$ represents an $i^{th}$ filter coefficient's updated value, $h_{old}(i)$ represents said $i^{th}$ filter coefficient's previous value, $u_w(i)$ denotes an $i^{th}$ sample of the filtered error signal, and $e_w$ denotes the portion of said error signal passed by said filter means.

34. The apparatus of claim 30 wherein spectral energy included within said feedback signal and within said filtered error signal is confined to frequencies between 3 and 5 kiloHertz.

* * * * *

UNITED STATES PATENT AND TRADEMARK OFFICE

CERTIFICATE OF CORRECTION

PATENT NO. : 5,402,496

DATED : March 28, 1995

INVENTOR(S) : Soli et al.

It is certified that error appears in the above-indentified patent and that said Letters Patent is hereby corrected as shown below:

Column 12, line 41, delete "$h_{new}(i) = (1-\beta)h_{old}(i) + \mu u_2(i)e_w$" and insert therefor -- $h_{new}(i) = (1-\beta)h_{old}(i) + \mu u_w(i)e_w$ --.

Signed and Sealed this

Twenty-second Day of August, 1995

Attest:

BRUCE LEHMAN

*Attesting Officer*

*Commissioner of Patents and Trademarks*